United States Patent
Thompson

[15] 3,693,268
[45] Sept. 26, 1972

[54] DUAL ANSWER MODE TEACHING SYSTEM

[72] Inventor: Francis T. Thompson, Murrysville, Pa.

[73] Assignee: Westinghouse Electric Corporation, Pittsburgh, Pa.

[22] Filed: Oct. 13, 1970

[21] Appl. No.: 80,360

[52] U.S. Cl. .................................................35/48 R
[51] Int. Cl. .........................................................G09b
[58] Field of Search.......................35/9 A, 9 B, 98 R

[56] References Cited

UNITED STATES PATENTS

| | | | |
|---|---|---|---|
| 3,408,749 | 11/1968 | Brudner | 35/9 A |
| 3,504,447 | 4/1970 | Brudner | 35/9 B |
| 3,577,657 | 5/1971 | Plumly | 35/48 |
| 3,501,851 | 3/1970 | Price, Jr. et al. | 35/9 A |
| 3,504,446 | 4/1970 | Brunell et al. | 35/9 B |
| 3,597,855 | 8/1971 | Stejskal et al. | 35/9 A |

Primary Examiner—Robert W. Michell
Assistant Examiner—J. H. Wolff
Attorney—F. H. Henson, C. F. Renz and A. S. Oddi

[57] ABSTRACT

A teaching system wherein the correctness of a student response is determined on the basis of a commutative or non-commutative mode of operation by storing correct answer information in a manner corresponding to the mode of operation and modifying the correct answer information in accordance with student response when operating in the commutative mode and comparing a correct answer information with the student response when operative in the non-commutative mode so that an indication of the correctness of the student answer is provided in either mode of operation.

9 Claims, 4 Drawing Figures

DUAL ANSWER MODE TEACHING SYSTEM

REFERENCE TO RELATED APPLICATION

The present application is related to copending application Ser. No. 80,359 (W.E. 42,028) by F. T. Thompson Shan C. Sun filed concurrently herewith, entitled "Remedial Branching Teaching System."

BACKGROUND OF THE INVENTION

1. Field of the Invention:

The present invention relates to teaching systems and, more particularly, to answering modes of operation for teaching systems.

2. Discussion of the Prior Art:

In U.S. Pat. No. 3,408,749 by H. J. Brudner a remedial branching type of teaching system is taught employing a film format wherein a plurality of picture and sound tracks are provided thereon. The student in a typical primary lesson sequence is presented with visual information on a given track along with the corresponding audio information as the film is being driven in the forward direction. At the end of the lesson sequence, the student is asked a question (or questions) concerning the subject matter of the lesson. The correct answer has been recorded on a code track of the film and is entered into the teaching system. The student enters his answer through a student terminal, which may, for example, comprise an alpha-numeric keyboard. The correct answer and the student input are compared according to the answering mode of the teaching system. If a correct answer is registered according to the answer mode, the film will be advanced in the forward direction on the same track to the next teaching sequence. If, however, the answer entered by the student is determined to be an incorrect answer according to the answering mode, the teaching system will be indexed to a remedial track and the film will be driven in the reverse direction with the student being presented with remedial video and audio information correlated with the primary lesson sequence in an attempt to enable the student to answer the originally presented question correctly. At the end of the remedial sequence the system is indexed to the primary lesson sequence and the film driven in the forward direction so that the student is again presented with the question at the end thereof. If the student then answers the question correctly, the teaching system then will proceed on the same track in the forward direction to the next lesson sequence.

An answering mode for the described teaching system is described in U.S. Pat. No. 3,504,447 by H. J. Brudner. In this answering mode, the correct answer from code tracks of the film is stored in an array of flip-flops. In response to the correct answer the array of flip-flops is set in a predetermined binary manner. The student by depressing selected keys of an alpha-numeric keyboard causes the binary state of the associated flip-flop to be reversed, that is, a zero goes to a one and a one goes to a zero. A correct answer is thus scored if after the student answer has been entered, all of the flip-flops of the array end up in a zero state. In U.S. Patent 3,504,446, by K. Brunnel, and V. P. Honeiser, an additional feature is added to the described answering mode wherein the correct number of characters in the student response is included in the answer code on the film and a counter is provided for counting the number of student characters entered. A correct answer is therefore determined by all of the flip-flops ending up in a zero binary state and the correct number of characters being inputted by the student.

A limitation of the described system is that it is operative only in a "commutative" mode, that is, AB=BA=. Accordingly, a student answer 17 would be indistinguishable from the answer 71. Another shortcoming of the described system is the requirement for the continuous availability of a parallel readout from the code tracks of the film limits the size of the alphabet which can be utilized.

SUMMARY OF THE INVENTION

Broadly the present invention provides a teaching system capable of operating in both a commutative and a non-commutative answering mode which is adaptable to accommodate a relatively large number of identifiable characters and which makes efficient use of the electronic memory through its use in both answering modes.

DESCRIPTION OF THE PREFERRED EMBODIMENT

Figure 1:
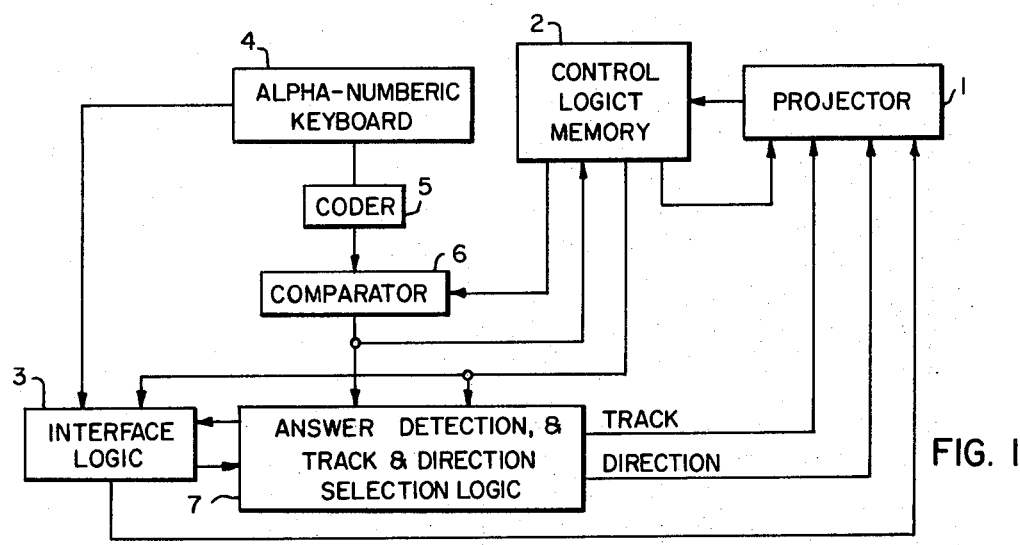
FIG. 1 is a simplified functional block diagram of the teaching system embodying the present invention.

Referring to FIG. 1, a simplified block diagram of a teaching system is shown capable of operation according to two answering modes, namely, (1) the commutative mode (herein the PATTERN mode) and (2) the non-commutative mode (herein the SYMBOL mode). The system includes an audio-visual projector 1 operative with a film such as the multitrack film F shown in FIG. 2.

Figure 2:
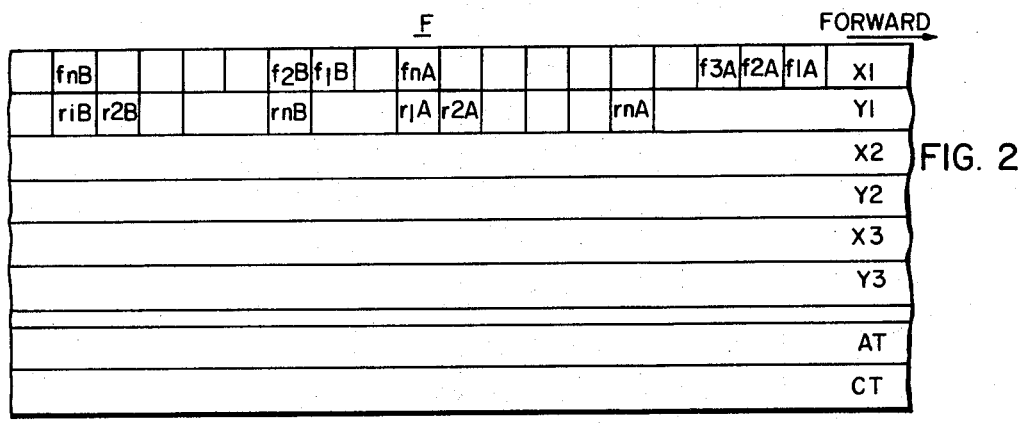
FIG. 2 is a schematic representation of the multitrack film as employed herein.

The film F in FIG. 2 includes six picture tracks X1, X2, X3, Y1, Y2 and Y3; six audio tracks AT providing correlated sound with the respective picture tracks and six code tracks CT correlated with the respective picture tracks. In the schematic representation of FIG. 2 only six tracks are shown, however, it should be understood that other numbers of track arrangements and formats can be utilized.

Picture track X1 is shown to include a plurality of picture frames $f1A, f2A, f3A \ldots fNA$ comprising a teaching sequence. Following this sequence is a B sequence comprising picture frames $f1B, f2B, f3B \ldots fNB$. The forward direction is indicated on FIG. 2 with the projector 1 receiving sequentially pictorial frames according to the increasing numbers $f1A, f2A, f3A \ldots$. Similar primary lesson sequences are included on the pictorial tracks X2 and X3.

The pictorial track Y1 is defined as a remedial track for the primary track X1 and is shown to include a remedial sequence $r1A, r2A \ldots rNA$ for the primary sequence $f1A$–$fNA$ with the film being driven in the reverse direction with respect to the direction for the primary track $f1A$–$fNA$. On the track Y1 is also included a remedial sequence $r1B$–$rNB$ for the primary sequence $f1B$–$fNB$. Tracks Y2 and Y3 would also contain remedial sequences corresponding to the primary sequence included upon the respective tracks X2 and X3. It should be understood that different primary and remedial formats could be employed if desired. For example, multiple remedial tracks could be employed to provide a choice of remedial instruction according to student response. Also, a format could be employed where in accordance with student response, a primary instruction sequence in a different track would be selected for presentation to the student rather than the teaching sequence in the same track or one of the remedial sequences.

On the respective audio tracks AT of the film F audio information correlated to the pictorial information of the primary and remedial tracks is recorded by standard film recording techniques to be played back in the forward or reverse direction of the primary and remedial tracks respectively. Recorded on the respective tracks of the code tracks CT of the code F is control information and correct answer information. Control information is provided in the form of serial binary bits so coded to enable the logic of the teaching system to perform the desired functions in response thereto. For example, the control bits recorded on the respective code track controls the stopping of the projector at the picture frame wherein a question or questions are displayed for the student to attempt to answer. Accordingly, control bits would stop the projector at the frame fNA where a question (or questions) would be displayed for the student. Additionally, the control bits include information as to the desired answering mode of operation to be employed, that is, the PATTERN or the SYMBOL mode. The correct answer information would also be coded in the form of serial binary bits and would be encoded according to the answering mode being employed for the particular lesson sequence which will be discussed in further detail below.

Accordingly, in FIG. 1, the projector 1 would display the lesson sequence $f1A$–$fNA$, for example, to the student, with the control and correct answer information on the associated code track of the film f being readout and applied to a control logic memory 2 which in response to the coded control information sets up the answering mode for that particular teaching sequence. Also the correct answer bits in the proper form are stored in the memory portion of the functional block 2. Additionally, the response to the control information the block 2 outputs a signal to interface logic 3 which supplies a stop output to the projector 1 in order to stop it at the frame $f1N$ for the presentation of the question to the student.

Figure 3:
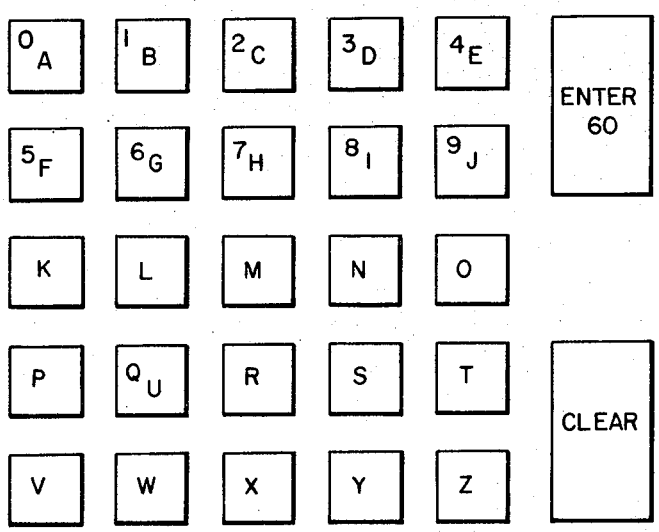
FIG. 3 is a representation of the alpha-numerical keyboard arrangement used herein.

The student response to the question asked is inputted via an alpha-numeric keyboard 4. FIG. 3 shows a possible arrangement for the keyboard 4 as comprising a 5 × 5 array of characters. Thus, 25 separate character inputs may be provided although 36 characters are presented.

In FIG. 1 the selected character output of the keyboard 4 is applied to a coder 5. The coder 5 may comprise a 5-bit encoder which provides a 5-bit output corresponding to the particular character selected on the keyboard 4. An example of the bit output of the coder 5 is shown in the following table where the individual bits $K_0$, $K_1$, $K_2$, $K_3$, $K_4$ indicate respectively a serial binary count $2^0$, $2^1$, $2^2$, $2^3$, $2^4$.

|        |       | $k_2$  |       | $k_4$ |       |
|        | $k_3$ |        |       |       | $k_3$ |
|  $k_2$ |       |        | $k_2$ |       | $k_2$ |
|---|---|---|---|---|---|
| $k_0$ |   | A/0 E/4 | 1/8 M | $Q_U$ V Z |
|       |   | B/1 F/5 | J/9 N | R W |
|       | $k_1$ | C/2 G/6 | K O | S X |
| $k_0$ |   | D/3 H/7 | L P | T Y |

Examples of the 5-bit output of the coder 5 for various selected characters are:

|     | $k_4$ | $k_3$ | $k_2$ | $k_1$ | $K_0$ |
|-----|-------|-------|-------|-------|-------|
| A/0 | 0 | 0 | 0 | 0 | 0 |
| D/3 | 0 | 0 | 0 | 0 | 1 |
| K   | 0 | 1 | 0 | 1 | 0 |
| Z   | 1 | 1 | 0 | 0 | 0 |

The 5-bit output of the coder 5 is applied to a comparator 6. The other input to the comparator 6 is from the control logic and memory 2. The compared output of the comparator 6 is indicative of either correspondence of the student response made via the keyboard 4 to the correct stored answer in the functional block 2 or to a particular bit of information contained in the memory of functional block 2. The comparator 6 is applied to functional block 2. The output of the comparator 6 is also applied to functional block 7 comprising answer detection and track and direction selection logic. Reference is made to the cross-referenced application cited above for an implementation of the functions of block 7. The block 7 also receives an input from the control logic and memory 2 for establishing the functional operation of the block 7 in accordance to the particular answer mode designated. Also, the interface logic 3 receives its input from block 2 to be established in the proper operative state.

The output of the comparator 6 when operating in one mode are stored in functional block 7. In a second mode, the information stored in functional block 2 is transferred to functional block 7. When the student depresses the ENTER/GO button on the keyboard array as shown in FIG. 3 the stored and the transferred information in functional block 7 is examined. According to these inputs to the functional block 7 a particular track of the film F is selected and this track input applied to the projector 1. Also, the direction of the particular track is to be driven, that is, in the forward or reverse direction, is supplied as a DIRECTION input to the projector 1 from the block 7. Additionally, an input is supplied from the interface logic 3 to the projector 1 to cause the film to be driven in the selected direction and the next lesson sequence to commence, whether it be a primary sequence if the student has given a correct response, or a remedial sequence if an incorrect response was given.

If the student does not wish his answer as selected on the keyboard 4 to be entered, he may depress the CLEAR button as shown on the keyboard of FIG. 3 which prohibits the stored or transferred information in functional block 7 from being evaluated and completely clears the previous student response and the previous comparator information stored in functional block 7. The correct answer information remains stored in the memory portion of the functional block 2. The student may then proceed to enter his new answer which will then be processed with regard to the stored answer in the memory portion of the functional block 2. By then depressing the ENTER GO button, the block 7 will process the information from the stored output of the comparator 6 and the information stored in the memory of functional block 2 to cause the track direction to be selected and the projector started in the indicated direction according to the student response.

Figure 4:
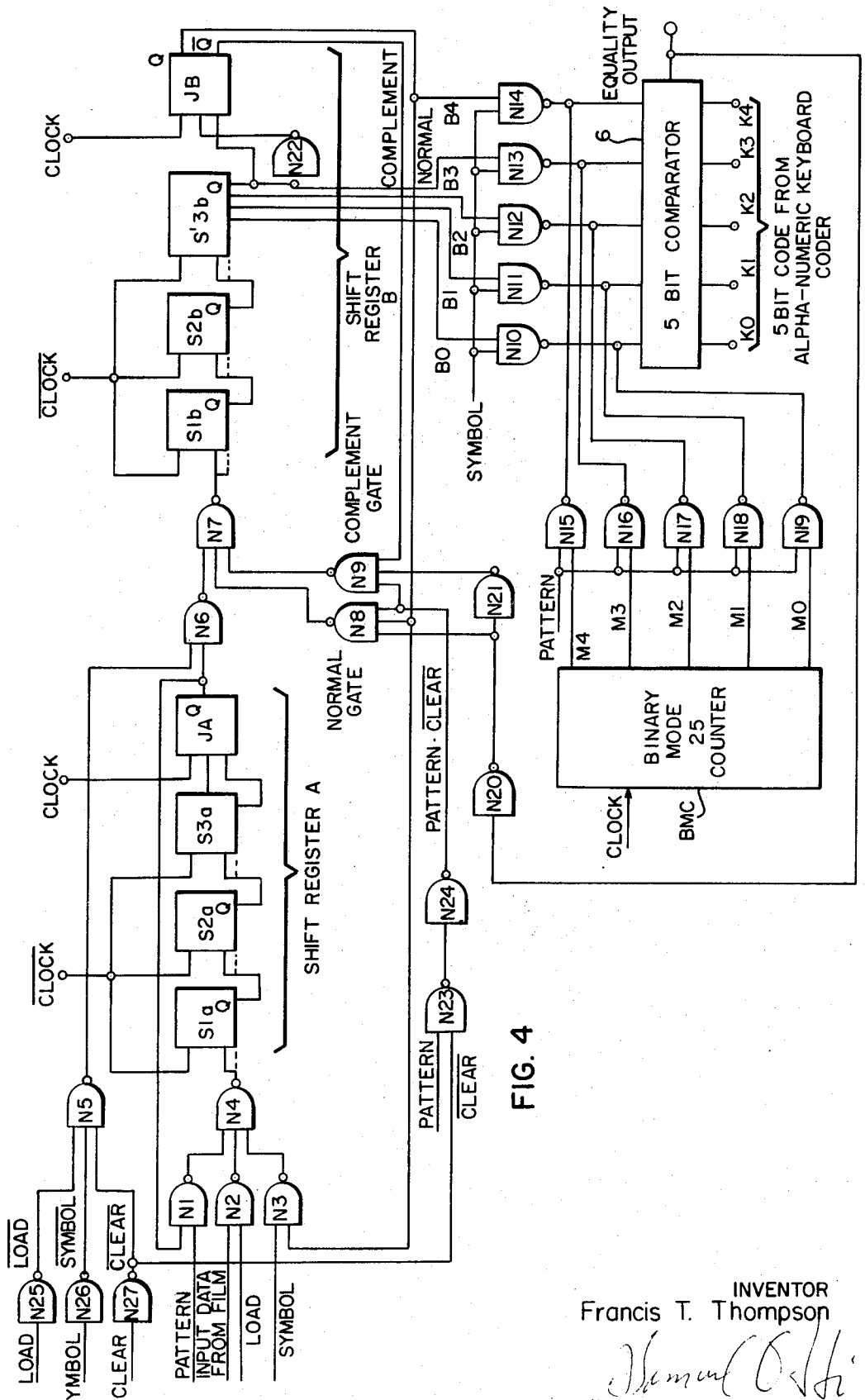
FIG. 4 is a schematic-block diagram of the system for effecting the dual answering mode operation of the present invention.

In view of the preceding functional description of the teaching system of FIG. 1, the particular implementation as shown in FIG. 4 for effecting the operation of the system according to the PATTERN or SYMBOL answering mode will now be described.

FIG. 4 shows the implementation for performing the dual answering mode functions of the present invention. All of the logical circuitry shown would be included within functional block 2 designated control logic and memory in FIG. 1 except for the comparator 6 of FIG. 1 which is designated as a 5-bit comparator in FIG. 4. A shift register A, a shift register B, a binary mode counter BMC and NAND gates N1 – 27 are illustrated in FIG. 4.

The shift registers A and B each have a capacity of 25 bits. Thus, the commulative capacity of the registers A and B is 50 bits. The shift register A includes three 8-bit shift registers S1a, S2a and S3a and a one-bit shift register JA comprising a JK flip-flop. The shift registers S1a, S2a, S3a and JA are connected in cascade to provide a total capacity of 25 bits. The shift register b comprises 8-bit shift registers S1b, S2b and S'3b and a one-bit shift register JB comprising a JK flip-flop. These latter named shift registers are also connected in cascade to provide a 25 bit capacity. The shift registers S1a, S2a, S3a, S1b, and S2b may comprise type SN7491AN. The JK flip-flops JA and JB may comprise type SN7473. The 8-bit shift register S'3b is of the output type and provides the binary output B0, B1, B3 and B4. The shift register S'3b may be of the type DM8570.

The input selection with shift register A is accomplished by using the NAND gates N1, N2, N3 and N4. The input selection for the shift register B is accomplished by using the NAND gates N5, N6, N7, N8 and N9.

In the following discussion when it is indicated that a particular mode of operation is to be effected, for example, PATTERN, LOAD, CLEAR, SYMBOL, ONE binary signal will be utilized. The complement of these modes will be indicated, for example, as $\overline{LOAD}$, $\overline{CLEAR}$. Also, the designations CLOCK and $\overline{CLOCK}$ will indicated respectively, ONE and ZERO binary signals.

LOADING

The answer information loading operation is performed by applying a LOAD input to NAND gates N2 and N25. The LOAD command is mutually exclusive with PATTERN, SYMBOL and CLEAR and logic not shown ensures that PATTERN, SYMBOL and CLEAR are in a ZERO state when LOAD is in the ONE state. Thus during the loading operation NAND gates N2 and N6 are open to pass information while NAND gates N1, N3, N8 and N9 are closed. NAND gate N2 has as its other input the input data from the film F corresponding to the correct answer information in serial binary form. Accordingly, the output of the NAND N4 will change in response to the binary input from the film F, so that if a ONE is encoded on the film a ONE will also be entered into the shift register A. The NAND gate N5 supplies a ONE input to the NAND gate N6 during the LOAD mode of operation so that the NAND N6 responds to the output of the shift register A. Since the other two inputs to the NAND N7 are ONE's, the NAND N7 will transfer the output of the shift register A into the shift register B. The inputs to the NAND gate N7 will be discussed in further detail below.

With 50 bits of information being stored in shift registers A and B, the answering system is ready for a student to input his responses to a question presented at the end of a teaching sequence as discussed above. During the loading operation a number of control bits are also stored in a shift register memory not shown in FIG. 4. These control bits include information as to the desired answering mode to be employed, i.e., the PATTERN or the SYMBOL mode.

PATTERN ANSWER MODE OF OPERATION

In the PATTERN mode of operation identical correct answer information is loaded, respectively, into shift register A and shift register B. In the PATTERN mode of operation, a ONE at a selected location within the shift register A will be indicative of a particular character corresponding to one of the characters of the keyboard array of FIG. 3.

Hence, if the correct answer information coded on the film is the letter M, the 12th bit input would be a binary ONE. If a complete correct answer, for example, were MOON, the 13th bit corresponding to the letter N would also be a ONE, while all of the other bits would be ZERO's with the repeat of the letter O being processed as a ZERO, as will be explained in further detail below. The 25-bit entry for storing the correct answer MOON would be:

0000000000001100000000000

At the end of the loading operation the 25-bits in shift register B are identical to those in shift register A. At the end of the loading sequence the LOAD signal becomes a ZERO, thereby blocking NAND gates N2 and N6. Also at the end of the loading sequence the control bits, when operating in the PATTERN mode, will cause the PATTERN signal input to NAND gates N1 and N23 to be in the ONE state. This causes NAND gates N1 and either gate N8 or gate N9 to be enabled to pass information. This permits the output of the JK flip-flop JA of the shift register A to pass through NAND gates N1 and N4 into the input of shift register A. The information in shift register A will therefore recirculate when clock pulses are applied to this shift register. The PATTERN mode is mutually exclusive with the SYMBOL mode and therefore NAND N3 is blocked in the PATTERN mode. When the output of NAND gate N20 is a ONE, NAND N8 and NAND N7 pass the information from the normal output Q of the JK flip-flop JB into the input of shift register B. For this condition, the information in shift register B will recirculate when clock pulses are applied to this shift register.

In the PATTERN mode of operation, NAND gates N15–N19 at the output of the binary mode 25 counter BMC are open and NAND gates N10–N14 receiving the 5-bit output of the shift register B are blocked. In response to the student selecting a particular character as presented on the alpha-numeric keyboard, a 5-bit input is provided at the input K0, K1, K2, K3, and K4 of the 5-bit comparator 6, corresponding to the binary count of the character selected. For example, if the first character of the student response were the letter M, the input to the 5-bit comparator 6 would be 00110. In response to the student entry being made, 25 CLOCK pulses are applied to the binary mode 25 counter BMC which comprises a 5-bit counter constrained to 25 states. This binary counter will thus count in a binary manner, with the binary output M0, M1, M2, M3, M4, ($2^0$, $2^1$, $2^2$, $2^3$, $2^4$, respectively), being respectively provided at the designated outputs thereof. The CLOCK pulses are also supplied to the shaft register B and input of the JK flip-flop JB and $\overline{CLOCK}$ pulses are applied to respective inputs of the shift registers S1$b$, S2$b$ and S'3$b$, so that the correct answer information stored in the shift register B sequentially appears at the normal output Q and complementary output $\overline{Q}$ of the JK flip-flop JB. The normal Q output of the JK flip-flop JB is applied as an input to the normal NAND gate N8 and the complementary output $\overline{Q}$ is applied as an input to the complement NAND gate N9. The output of the NAND gates N8 and N9 are applied as respective inputs to the NAND gate N7. The other input to both the NAND gates N8 and N9 is enabled by the PATTERN input applied to NAND N23 acting through NAND N24.

In the example given where the word MOON is the correct answer and the first student input from the keyboard is the letter M the first 11 counts of the binary mode counter BMC will be different from the K0, K1, K2, K3 and K4 input to the comparator 6 corresponding to the binary number 12 indicative of the letter M. During the first 11 counts, the comparator 6 supplies a ZERO inequality output to the NAND gate N20 which in response thereto supplies a ONE output to the normal NAND gate N8. In the PATTERN mode, the NAND gate N8 receives a ONE input from NAND N24 as its other input as does the complement gate N9. The other input to the normal gate N8 is the normal output Q from the shift register B. Hence, during the first 11 counts of the present example, the normal gate N8 will supply a ONE output in response to each ZERO input thereto from the Q output to the NAND gate N7, so that a ZERO is inputted to the shift register B for each ZERO outputted which is shifted one bit at a time in response thereto. Similarly, a ONE is inputted to the shift register B for each ONE outputted.

The ONE output of the NAND gate N20 is also applied to the NAND gate N21 and is inverted therein to a ZERO output to the complement NAND gate N9, which blocks this gate from passing the complement output $\overline{Q}$ of the shift register B. Accordingly, when there is non-correspondence between the student response K0–K4 and the binary output count M0–M4, the normal path including the normal NAND gate N8 is employed with the complement gate N9 being blocked, and the normal output of the shift register B being restored therein in the same relative position.

However, at the 12th count, there will be correspondence between the binary count output M0–M4 (00110) and the student input K0–K4 (00110) so that the comparator 6 will provide an equality output in the form of a ONE to the NAND gate N20. In response thereto, the NAND gate N20 will supply a ZERO to the normal gate N8 thereby blocking this gate. However, the ZERO output of the NAND gate N20 will cause the output of the NAND gate N21 to go to a ONE to open the Complement gate N9 which will respond to the $\overline{Q}$ output of the shift register B, which at the 12th count will be a ZERO. Accordingly, the complement gate N9 will output a ONE to the NAND gate N7 so that a ZERO will be inputted into the shift register B for the 12th bit, as opposed to the originally stored ONE. It can thus be observed that in the PATTERN mode when there is correspondence between the student response and the correct stored answer, that bit of the correct stored answer will be complemented for restorage in the shift register B. In the case of non-correspondence due to a student error, the correct answer bit will be restored as a ONE indicating an error in the student answer.

The remaining clock pulses of the 25 pulse series will then show no correspondence so that after 25 CLOCK pulses a ZERO would be stored in the 12th bit of the shift register B in place of the ONE previously stored. If the next student input should be the letter O the same sequence of operation would occur with the normal path being utilized for the shift register B until the 14th count had been reached wherein at this time the ZERO output of the shift register B would be complemented to store a ONE in the 14th bit position. If the next student input should be again the letter O at the 14th count of the next sequence, the ONE outputted at this time would be complemented and a ZERO would again be stored at the 14th position.

If the next student input were the letter N, at the 13th count an equality output would be provided by the comparator 6 to activate the complement path of the shift register B to complement the ONE output of the shift register B at the 13th bit so that a ZERO would be inputted. At the end of the 25 count cycle, a ZERO would thus be stored at the 13th bit position.

In the given example, the student has at this time thus inputted the correct answer MOON and it can be seen that a ZERO appears in each of the 25 bit positions of the shift register B. If the student wishes to enter this answer as his final answer the ENTER/GO button on the keyboard is depressed and the contents of the shift register B is outputted by the application of 25 CLOCK pulses thereto. The presence of all ZERO's in the output from the shift register B is indicative of a correct answer while the presence of one or more ONE's would be indicative of an incorrect answer which could be readily sensed via logic circuits responsive to the binary ONE's. A further check on the correctness of the student's answer may be made by counting the number of student entries and comparing this with the correct number of entries. The correct number and entries can be stored as part of the control bit information.

If the student does not wish to enter the selected answer, rather than push the ENTER/GO button, he may select to clear his answer by depressing the CLEAR button of FIG. 3 which provides a ONE input to NAND N27. The CLEAR and PATTERN signals are independent and are both ONE in the CLEAR-PATTERN mode. In the CLEAR-PATTERN mode both the normal gate N8 and the complement gate N9 are blocked and gates N1, N4, N6 and N7 are open to permit the transfer of information. Then 25 CLOCK pulses are applied to the shift register A and the shift register B. As previously explained, the shift register A originally has stored therein the correct answer as encoded on the film F. In response to the CLOCK inputs thereto, the information stored in the shift register A is transferred from the shift register A via the gates 6 and 7 into the shift register B so that after 25 CLOCK counts the correct answer will again be stored in shift register B. Note also, that the output Q of the shift register A is inputted via the NAND gates N1 and N4 back into the shift register A for storage therein.

The student may then input his new answer so that the comparison is made between the student input K0–K4 and the binary count output M0–M4 of the counter BMC. When there is an inequality output from the comparator 6, the normal path is employed as discussed above so that the normal output of the shift register B is restored as a ZERO or a ONE as originally stored therein. When there is correspondence between the student input K0–K4 and the count output M0–M4, an equality output is provided by the comparator 6 which causes the complement path to be activated so that the then appearing bit of the shift register B is complemented and will be restored in the shift register B as the complement of its original stored condition.

After the student has completed his answer he may depress the ENTER/GO button to ascertain the correctness or incorrectness and proceed as previously described.

In the PATTERN mode of operation the order of keyboard entries is unimportant since this is a commutative mode of operation. Thus, if the correct answer is MOON the student may enter the individual letters in any order. Also, it should be noted that entries such as MBBN, NNNM, among others, would be interpreted as correct answers in the PATTERN mode of operation. However, this mode of operation is quite useful for multiple choice, structured communication, algebra, or other answers where incorrect spelling can be tolerated and the order of entering characters is unimportant.

SYMBOL ANSWERING MODE OF OPERATION

When the SYMBOL answering mode is desired for a particular question asked at the end of a teaching sequence, a SYMBOL indicating bit is included in the coded information corresponding to that particular sequence on the coding track of the film F. The SYMBOL mode is mutually exclusive from the PATTERN mode and information transfer occurs through NAND gates N3, N4, N6 and N7. Accordingly, a ONE SYMBOL input is supplied to the NAND gates N3 and N26 and also to the NAND gates N10–N14 which receive the binary 5 bit output B0, B1, B2, B3 and B4 of the shift register B. Additionally, the NAND gate N6 would receive a ONE input from the NAND gate N5.

When operative in the SYMBOL mode, correct answer information is stored in both the shift registers A and B employing the total 50 bit capacity of these registers. For example, ten 5-bit characters could be stored in the registers A and B or any other combination amounting to no more than 50 bits. In order to load the shift registers A and B, a LOAD signal is sensed from the code track of the film F and applied to the NAND gates N2, and N25 as previously described. The input information encoded on the film F is then applied through the NAND gate N2 and the NAND gate N4 to the shift register A and then through the NAND gates N6 and N7 into the shift register B until a total of 50 bits of information are stored in the shift registers A and B. It should be noted that the inputted information defines a particular multi-character word entered in a predetermined sequence such that each of the 5-bit combinations define a particular character in a particular position within the designated word.

It should be noted also that with a ZERO PATTERN input to NAND N23, the normal gate N8 and the complement gate N9 are blocked and accordingly are non-responsive to the output of the shift register B. Both the NAND gates N8 and N9 thus provide ONE outputs to the NAND gate N7 permitting the direct transfer of stored bits between the shift register A and the shift register B.

With the correct answer information being so stored to the extent of 50 bits in the shift registers A and B prior to the presentation of a question at the end of a teaching sequence, the system is set up for the reception of the student input via the keyboard of FIG. 3 in response to the question presented. In response to the student entry as applied to the comparator 6 from the coder 5 (FIG. 1) in the form of the 5-bit input K0–K4, five bits at a time on a first-in-first-out basis are outputted from the last four stages S'3b and JB of the shift register B in the form of the binary output B0–B4. The B0–B4 output is applied respectively to the NAND gates N10–N14, which in response thereto, provide a 5-bit output to the comparator 6 for comparison with the student input K0–K4. If there is coincidence between the two 5 bit inputs to the comparator 6 an equality output will be provided from the comparator 6 indicative of a correct first character in the student response. The next 5 bits stored in the shift register B are then shifted to the outputs B0–B4 under the control of the CLOCK inputs with the first 5 bits being transferred from the Q output of the shift register B through the NAND gate N3 and the NAND gate N4 to the input of the shift register A. The position of the shifted bits is available if required since the binary mode 25 counter BMC receives and counts the CLOCK inputs.

The second 5 bit combination output from the shift register B is supplied through the NAND gates N10–N14 to the comparator 6 where it is compared with the second student entry. The correspondence therebetween provides an equality output from the comparator 6. An inequality output would be indicative of a student error.

The sequence thus continues with the previous 5 bit output being transferred to the input of the shift register with the next 5 bit output from shift register B being applied to be compared to the student response in the comparator 6. After the complete student entry has been made, the student may then test the correctness of his answer by depressing the ENTER/GO button on the keyboard of FIG. 3. If equality outputs are provided by the comparator 6 for each of the student entries, a correct answer will be registered permitting the system to be set up for the next teaching sequence. Complete correctness can be ensured by counting the number of student entries and comparing this with the correct number of entries. A correct answer would then require an equality output for each entry and the correct number of entries. If any inequality outputs appear in the output of the comparator 6 the system will be set up for a remedial teaching sequence as discussed above. If the student should decide to remove previously entered answers, the CLEAR button is depressed which would prohibit evaluating the correctness of the previous student response. Depressing the CLEAR button provides a ONE input to NAND N27. Since the correct answer information has been non-destructively recycled in the shift registers A and B, it is only necessary to complete the recycling of information in the shift registers until it is in the position in which it was originally stored. The SYMBOL signal and the CLEAR signal are independent and are both ONE in the CLEAR-SYMBOL mode. Therefore, the SYMBOL signal maintains the signal path through NAND gates N3, N4, N6 and N7. The CLEAR signal causes CLOCK pulses to be provided to shift registers A and B and the binary counter BMC until counter BMC completes its 25 count cycle at which time the answer information in the shift register has recycled non-destructively to its original position. The system is then set up to process the next student answer without the necessity of reloading the correct answer information from the film F.

In the present implementation utilizing 50 bits of correct answer information, 10 character words may be exactly compared. It is of course possible by increasing the storage capacity of the shift registers A and B that longer correct answer information could be utilized. However, for most purposes if the first ten characters are correct, the correctness of the complete answer may be presumed with high probability of correctness. Additionally, an indication of the correctness of the student answer may be given by counting the number of student entries and comparing this with the correct number of entries. For example, if the correct answer to a question were the eleven letter word MISSISSIPPI, the first ten letters of the word MISSISSIPPI can be exactly compared and an equality output provided for each exact comparison of the stored correct letter and the corresponding student entry. However, since the capacity of the shift registers A and B is only ten 5 bit characters, the 11th letter I of the word MISSISSIPPI cannot be exactly identified. Therefore, any 11th student entry will be considered as correct. Nonetheless, with the correct entry by the student of the first 10 letters, the correctness of the total 11th letter student response can be expected with a high degree of probability.

Once a student has completed a given teaching sequence by answering a question or questions at the end thereof, either according to the appropriate PATTERN or SYMBOL answering mode as indicated in the coding for the particular teaching sequence, the next teaching sequence may proceed with the PATTERN or SYMBOL answering mode being identified to establish the control logic and memory functions of FIG. 4 as described above, so that the correct answer information is loaded into the shift registers according to the selected mode and the student entries compared with the correct answer information in their respective PATTERN or SYMBOL modes.

In summary, the teaching system of the present invention provides operation according to a dual answering mode wherein student responses may be interpreted with regard to correct answer information on a commutative basis wherein the exact correspondence of the student response and the correct answer is not required, and in a non-commutative mode where the exact correspondence is required. It should be noted that the same shift registers A and B are utilized in both modes of operation providing for the efficient and economic implementation of the present invention. Moreover, the present invention permits the student to clear the previous undesired answer and to enter a new answer without the requirements for re-running the film or for holding the film in readiness to re-input the correct answer information.

I claim:

1. An apparatus for determining the accuracy of a constructed response with respect to a stored answer on the basis of a first and second mode of operation, comprising, first means for storing lesson material comprised of individual segments of instructional information, requests for a constructed response associated with said instructional information, answer information associated with each request for a constructed response, said answer information being represented in at least a first and second format, and control information including information for identifying the format of the answer information associated with each request, second means operatively connected to said first means for reproducing said instructional information and associated request for a constructed response, third means operatively connected to said first means for storing in digital form said answer information, wherein answer information in said first format is stored as n individual bits, and answer information in said second format is stored as $n$ digital bits subdivided into a series of groups of $m$ bits each, starting with a first group and ending with $n/m$ group, fourth means for providing a constructed response to said requests reproduced by said second means, said fourth means including a plurality of manually operated actuator means, the operation of each actuator means producing a multi-bit digital word, fifth means adapted to operate in a first and second mode and having a first, second and third input means, said first input means being operatively connected to said first means to derive said control information therefrom, said control information indicating the format of the answer information stored in said third means, control information indicating said first answer format causing said fifth means to operate in said first mode while control information indicating said second answer format causing said fifth means to operate in said second mode, said third means being operatively connected to said second input means, and said fourth means being operatively connected to said third input means, said fifth means for operation in said first mode including:

sixth means for relating the operation of each actuator means to a specific bit of said n bits of said answer information stored in said third means, the multi-bit digital word associated with each actuator means functioning as an address to a specific bit location in said third means, seventh means for responding to each operation of said actuator means to change the state of the digital bit stored in the respective bit locations of said third means, eighth means for analyzing the state of the n digital bits of said third means to determine the accuracy of a constructed response to the request reproduced by said second means, said fifth means for operation in said second mode including:

ninth means for comparing the multi-bit digital word produced by the first operation of an actuator means with said first group of m digital bits stored in said third means, and comparing the multi-bit digital words sequentially produced by subsequent operations of said actuator means with the group of m digital bits in said series of n/m groups corresponding in number to the number of the operation of said actuator means, and producing an output signal indicative of the accuracy of the constructed response to the request reproduced by said second means.

2. An apparatus as claimed in claim 1 wherein said first means comprises a multi-track film, and second means comprises a projector.

3. An apparatus as claimed in claim 1 wherein said multi-bit digital word is comprised of m bits.

4. An apparatus as claimed in claim 1 wherein said plurality of actuator means comprises an alpha-numeric keyboard.

5. An apparatus as claimed in claim 1 wherein said fifth means for operation in said first mode further clock means for selectively providing a clock output corresponding to said n bits, said third means responsive to said clock output to output sequentially the n bits of said answer information stored in said third means, and counting means for sequentially counting said clock output and providing a sequential count output, said fifth means operative in said first mode of operation to receive said sequential count output and said multi-bit digital word corresponding to the operation of an actuator means, to change the state of the digital bit stored in said third means when there is correspondence therebetween.

6. An apparatus for determining the accuracy of a constructed response with respect to a stored answer on the basis of a first and second mode of operation, comprising, first means for storing lesson material comprising individual segments of instructional information, requests for a constructed response associated with said instructional information, answer information associated with each request for a constructed response, said answer information being represented in at least a first and second format, and control information including information for identifying the format of the answer information associated with each request, second means operatively connected to said first means for reproducing said instructional information and associated requests for a constructed response, third means operatively connected to said first means including operatively connected first and second shift register means for storing in digital form said answer information, wherein said answer information in said first format is comprised of n individual bits, said answer information in said second format is comprised of 2n bits divided into a series of groups of m bits each starting with a first group and ending with a 2n/m group, said third means responding to answer information in said first format by storing a first answer of n bits in said first shift register means and a second answer of n bits in said second shift register means, said third means responding to answer information in said second format by storing said series of groups in the combination of said first and second shift register means, fourth means for providing a constructed response to said requests reproduced by said second means, said fourth means including a plurality of manually operated actuator means, the operation of each actuator means producing a multi-bit digital word, fifth means adapted to operate in a first and second mode and having a first, second and third input means, said first input means being operatively connected to said first means to derive said control information therefrom, said control information indicating the format of the answer information stored in said third means, control information indicating said first answer format causing said fifth means to operate in said first mode while control information indicating said second answer format causing said fifth means to operate in said second mode, said third means being operatively connected to said second input means, and said fourth means being operatively connected to said third input means, said fifth means for operation in said first mode including:

sixth means for relating the operation of each actuator means to a specific bit of said *n* bits of said answer information stored in said second shift register means, the multi-bit digital word associated with each actuator means functioning as an address to a specific bit location in said second shift register means, seventh means for responding to each operation of said actuator means to change the state of the digital bit stored in the respective bit location of said second shift register means, eighth means for analyzing the state of the n digital bits of said second shift register means to determine the accuracy of a constructed response to the request reproduced by said second means, said fifth means for operation in said second mode including:

ninth means for comparing the multi-bit digital word produced by the first operation of an actuator means with said first group of m digital bits stored in said third means and comparing the multi-bit digital words sequentially produced by subsequent operation of said actuator means with the group of m digital bits in said series of $2n/m$ groups corresponding in number to the number of the operation of said actuator means, and producing an output signal indicative of the accuracy of the constructed response to the request reproduced by said second means, tenth means for clearing the constructed response appearing in said second shift register means, and eleventh means for transferring the answer information stored in said first shift register means to said second shift register means while retaining said answer information in said first shift register means.

7. An apparatus as claimed in claim 6 wherein said multi-bit digital word is comprised of $m$ bits.

8. An apparatus as claimed in claim 6 wherein said plurality of actuator means comprises an alpha-numeric keyboard.

9. An apparatus as claimed in claim 6 wherein said fifth means for operation in said first mode further includes, clock means for selectively providing a clock output corresponding to said $n$ bits, said second shift register means responsive to said clock output to output sequentially the n bits of said answer information stored in said second shift register means, and counting means for sequentially counting said clock output and providing a sequential count output, said fifth means operative in said first mode of operation to receive said sequential count output and said multi-bit digital word corresponding to the operation of an actuator means to change the state of the digital bit stored in said second shift register means when there is correspondence therebetween.

* * * * *